United States Patent
Jung et al.

(10) Patent No.: US 9,429,736 B2
(45) Date of Patent: *Aug. 30, 2016

(54) OPTICAL SYSTEM

(71) Applicant: Samsung Electro-Mechanics Co., Ltd., Suwon-si (KR)

(72) Inventors: Jin Hwa Jung, Suwon-si (KR); Yong Joo Jo, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/023,273

(22) Filed: Sep. 10, 2013

(65) Prior Publication Data

US 2014/0071542 A1 Mar. 13, 2014

(30) Foreign Application Priority Data

Sep. 10, 2012 (KR) .................. 10-2012-0099876
Jun. 25, 2013 (KR) .................. 10-2013-0072836

(51) Int. Cl.
*G02B 9/62* (2006.01)
*G02B 13/00* (2006.01)

(52) U.S. Cl.
CPC .................. *G02B 13/0045* (2013.01)

(58) Field of Classification Search
CPC ..... G02B 13/0045; G02B 13/18; G02B 9/62
USPC ........................ 359/713, 756, 757
See application file for complete search history.

(56) References Cited

U.S. PATENT DOCUMENTS

| | | | | |
|---|---|---|---|---|
| 4,080,048 | A | * | 3/1978 | Kimura .................. 359/750 |
| 6,008,884 | A | * | 12/1999 | Yamaguchi ......... G03F 7/70241 355/53 |
| 7,864,454 | B1 | * | 1/2011 | Tang .................. G02B 9/60 359/714 |
| 9,279,959 | B2 | * | 3/2016 | Jung .................. G02B 13/0045 |
| 2012/0243108 | A1 | * | 9/2012 | Tsai .................. G02B 13/18 359/713 |
| 2014/0043662 | A1 | * | 2/2014 | Nakayama et al. .......... 358/475 |
| 2014/0111876 | A1 | * | 4/2014 | Tang et al. .................. 359/757 |

(Continued)

FOREIGN PATENT DOCUMENTS

| | | |
|---|---|---|
| JP | 2000-227550 A | 8/2000 |
| JP | 2005-164839 A | 6/2005 |
| JP | 2006-343554 A | 12/2006 |

(Continued)

OTHER PUBLICATIONS

KR 10-2013-0072836 Notice of Allowance dated May 23, 2014; 3pgs.

(Continued)

*Primary Examiner* — Scott J Sugarman
(74) *Attorney, Agent, or Firm* — NSIP Law

(57) ABSTRACT

The present invention relates to an optical system.
An optical system of the present invention includes, sequentially from an object side, a first lens having a positive refractive power and an object-side surface convex toward the object side; a second lens having a negative refractive power; a third lens having a negative refractive power; a fourth lens having a positive refractive power, a fifth lens having a negative refractive power and an image-side surface convex toward an image side; and a sixth lens having a negative refractive power and an image-side surface concave toward the image side.

11 Claims, 6 Drawing Sheets

(56) References Cited

U.S. PATENT DOCUMENTS

2014/0192422 A1* 7/2014 Tang et al. .................. 359/713
2015/0109692 A1* 4/2015 Son .................. G02B 13/0045
                                                    359/757

FOREIGN PATENT DOCUMENTS

| JP | 2007-333805 A | 12/2007 |
|---|---|---|
| JP | 2009-109630 A | 5/2009 |
| JP | 2012-008357 A | 1/2012 |
| JP | 2014-035397 A | 2/2014 |
| KR | 10-2009-0047745 A | 5/2009 |
| KR | 10-2010-00225551 A | 3/2010 |
| KR | 10-2010-0040357 A | 4/2010 |
| KR | 10-2011-0024872 A | 3/2011 |

OTHER PUBLICATIONS

JP 2013-187197 Office Action dated Jul. 15, 2014; 4pgs.

* cited by examiner

OPTICAL SYSTEM

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial Nos. 10-2012-0099876 and 10-2013-0072836, entitled filed Sep. 10, 2012 and Jun. 25, 2013, which are hereby incorporated by reference in their entirety into this application.

BACKGROUND OF THE INVENTION

1. Field of the Invention

The present invention relates to an optical system, and more particularly, to an optical system that consists of six lenses.

2. Description of the Related Art

In general, mobile communication means such as mobile communication terminals, PDA, and smartphones become to have various additional functions in addition to basic communication functions along with their increased use and diversification of services provided through communication technology.

In particular, camera modules mounted to the mobile communication means are in increasing demand as various convergence devices for high definition video shooting, automatic focus adjustment, and QR code recognition in addition to simple photo shooting using a single focus.

Further, as the size of the camera modules is gradually reduced, higher resolution is required, and manufacturing costs of the camera modules are gradually reduced along with price cuts of the mobile communication devices.

In order to reduce the unit price of the camera module, first, it is most preferred to reduce manufacturing costs of lens groups constituting an optical system embedded in the camera module. However, in order to satisfy the above-mentioned conditions on improvement of resolution, the optical system should be constituted by applying a glass lens having high optical performance, but it is impossible to reduce the manufacturing costs of the camera module by using several sheets of expensive glass lenses.

Further, when employing a plurality of glass lenses to overcome the resolution problem, it is impossible to reduce a weight of the optical system.

RELATED ART DOCUMENT

Patent Document

Patent Document 1: Korean Patent Laid-open Publication No. 2011-24872

SUMMARY OF THE INVENTION

Therefore, the present invention has been invented in order to overcome the above-described disadvantages and problems raised in a conventional mobile camera optical system and it is, therefore, an object of the present invention to provide an optical system that can implement high resolution and reduce manufacturing costs by configuring an optical system using six aspherical plastic lenses.

In accordance with one aspect of the present invention to achieve the object, there is provided an optical system including, sequentially from an object side: a first lens having a positive refractive power and an object-side surface convex toward the object side; a second lens having a negative refractive power, a third lens having a negative refractive power; a fourth lens having a positive refractive power; a fifth lens having a negative refractive power and an image-side surface convex toward an image side; and a sixth lens having a negative refractive power and an image-side surface concave toward the image side.

Further, the optical system satisfies the following Conditional Expression with respect to conditions on chromatic aberration correction.

$$|V3-V2|<41 \qquad \text{Conditional Expression 1}$$

Here, V3 is an Abbe number of the third lens, and V2 is an Abbe number of the second lens.

Further, the optical system satisfies the following Conditional Expression with respect to conditions on design of the optical system.

$$TTL/F<1.5 \qquad \text{Conditional Expression 2}$$

Here, TTL is a distance from the first lens to an image plane, and F is a focal length of the entire optical system.

Further, the optical system satisfies the following Conditional Expression with respect to conditions on miniaturization according to the focal length ratio of the optical system.

$$1<|F6/F|<6 \qquad \text{Conditional Expression 3}$$

Here, F6 is a focal length of the sixth lens, and F is a focal length of the entire optical system.

Further, the optical system satisfies the following Conditional Expression with respect to conditions on miniaturization according to the radius of curvature of the lenses of the optical system.

$$0<(R7+R10)/(R7-R10)<1.3 \qquad \text{Conditional Expression 4}$$

Here, R7 is a radius of curvature of an object-side surface of the fourth lens, and R10 is a radius of curvature of the upper surface of the fifth lens.

Further, the optical system satisfies the following Conditional Expression with respect to conditions on aberration correction of the optical system.

$$|R7/F|<5 \qquad \text{Conditional Expression 5}$$

Here, R7 is a radius of curvature of the object-side surface of the fourth lens, and F is a focal length of the entire optical system.

Further, the optical system satisfies the following Conditional Expression with respect to conditions on chromatic aberration correction of the optical system.

$$|Nd2-Nd5|<0.11 \qquad \text{Conditional Expression 6}$$

Here, Nd2 is a refractive index of the second lens at d-line wavelength (587.6 nm), and Nd5 is a refractive index of the fifth lens at d-line wavelength (587.6 nm).

Further, the optical system satisfies the following Conditional Expression with respect to conditions on spherical aberration correction of the optical system.

$$F3/F<-5 \qquad \text{Conditional Expression 7}$$

Here, F3 is a focal length of the third lens, and F is a focal length of the entire optical system.

And the first to sixth lenses may be plastic lenses, and both surfaces of the first to sixth lenses may be aspherical surfaces.

Further, an optical filter, which is formed of a cover glass coated with an infrared cut filter for blocking excessive infrared rays included in light introduced from the outside, may be further included between the sixth lens and the image plane.

BRIEF DESCRIPTION OF DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

A matter regarding to an operation effect including a technical configuration for an object of an optical system in accordance with the present invention to achieve the object will be clearly appreciated through the following detailed description with reference to the accompanying drawings illustrating preferable embodiments of the present invention.

However, in the following lens configuration diagram of each embodiment, the thickness, size, and shape of lenses may be somewhat exaggerated for detailed description of the present invention. Particularly, the shape of a spherical surface or an aspherical surface shown in the lens configuration diagram is shown as an example and not limited thereto.

Figure 1:
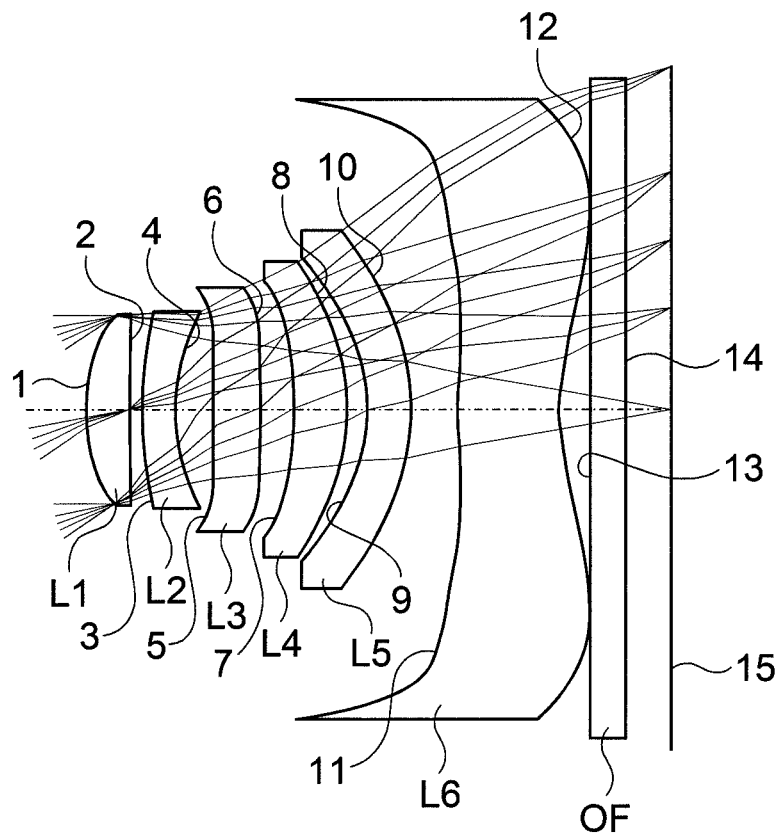
FIG. 1 is a configuration diagram showing lens arrangement of an optical system in accordance with a first embodiment of the present invention.

First, FIG. 1 is a lens configuration diagram showing an embodiment of an optical system in accordance with the present invention. As shown, an optical system of the present embodiment includes a first lens L1 having a positive refractive power, a second lens L2 having a negative refractive power, a third lens L3 having a negative refractive power, a fourth lens L4 having a positive refractive power, a fifth lens L5 having a negative refractive power, and a sixth lens L6 having a negative refractive power.

At this time, the first lens L1 may have a shape in which an object-side surface is convex toward an object side, the fifth lens L5 may have a shape in which an image-side surface is convex toward an image side, and the sixth lens L6 may have a shape in which an image-side surface is concave toward the image side.

Further, an optical filter OF, which is formed of an infrared filter for blocking excessive infrared rays included in light passing through the optical system or a cover glass coated with the infrared filter, may be provided between the sixth lens L6 and an image plane 15.

Further, in the optical system of the present invention, all of the first to sixth lenses L1 to L6 may be plastic lenses, and one or both surfaces of the first to sixth lenses L1 to L6 may be aspherical surfaces.

The reason for forming at least one surface of the lenses, which constitute the optical system in accordance with the present invention, as an aspherical surface is to improve the degree of freedom in design for facilitating correction of aberration including chromatic aberration and mitigating manufacturing tolerances. Further, the reason for forming all of the first to sixth lens L1 to L6 with plastic lenses is to configure an optical system that can be used in mobile devices by achieving a light weight even though the optical system consists of a plurality of lenses due to characteristics of the optical system having easiness in manufacture of aspherical surfaces compared to glass lenses and mainly mounted to the mobile devices.

Meanwhile, as mentioned above, the optical system of the present invention can perform aberration correction and achieve miniaturization while using a plurality of lenses by the following Conditional Expressions 1 and 2. Conditional Expressions and operational effects will be described below.

$$|V3-V2|<41 \qquad \text{Conditional Expression 1}$$

Here, V3 is an Abbe number of the third lens L3, and V2 is an Abbe number of the second lens L2.

Conditional Expression 1 is a condition on chromatic aberration correction of the optical system. It is possible to facilitate chromatic aberration correction by maintaining a difference in the Abbe number between the third lens L3 and the second lens L2 at less than a predetermined value. At this time, it is possible to minimize chromatic aberration when satisfying Conditional Expression 1, and the chromatic aberration may occur when deviating from an upper limit of Conditional Expression 1.

$$TTL/F<1.5 \qquad \text{Conditional Expression 2}$$

Here, TTL is a distance from the first lens L1 to the image plane 15, and F is a focal length of the entire optical system.

Conditional Expression 2, which is a condition on miniaturization according to the focal length ratio of the optical system, is a conditional expression on the ratio of the distance from the first lens L1 to the upper surface to the focal length of the entire optical system. At this time, when deviating from an upper limit of Conditional Expression 2, it is difficult to manufacture a compact optical system that satisfies a predetermined viewing angle required for mobile cameras.

$$1<|F6/F|<6 \qquad \text{Conditional Expression 3}$$

Here, F6 is a focal length of the sixth lens L6, and F is a focal length of the entire optical system.

Conditional Expression 3, which is a condition on miniaturization according to the focal length ratio of the optical system, is a conditional expression on the ratio of the focal length of the sixth lens L6 to the focal length of the entire optical system. At this time, when deviating from an upper limit of Conditional Expression 3, it is difficult to satisfy the condition of miniaturization since a refractive power of the entire optical system is reduced, and when deviating from a lower limit of Conditional Expression 3, it is difficult to correct a distortion due to deviation from telecentric characteristics.

$$0<(R7+R10)/(R7-R10)<1.3 \quad \text{Conditional Expression 4}$$

Here, R7 is a radius of curvature of an object-side surface of the fourth lens L4, and R10 is a radius of curvature of the upper surface of the fifth lens L5.

Conditional Expression 4, which is a condition on miniaturization according to the radius of curvature of the lenses of the optical system, is a conditional expression on the ratio of the sum and the difference of the radius of the curvature of the fourth lens L4 and the fifth lens L5. At this time, when deviating from an upper limit of Conditional Expression 4, it is difficult to achieve miniaturization and sensitivity of the lens is increased since an effective diameter of the lens is increased, and when deviating from a lower limit of Conditional Expression 4, it is impossible to obtain high resolution of the optical system.

$$|R7/F|<5 \quad \text{Conditional Expression 5}$$

Here, R7 is a radius of curvature of an object-side surface of the fourth lens L4, and F is a focal length of the entire optical system.

Conditional Expression 5, which is a condition on aberration correction of the optical system, is a conditional expression on the ratio of the radius of curvature of the object-side surface of the fourth lens L4 to the focal length of the entire optical system. At this time, when deviating from an upper limit of Conditional Expression 5, it is difficult to implement high resolution due to a difficulty in the aberration correction of the optical system.

$$|Nd2-Nd5|<0.11 \quad \text{Conditional Expression 6}$$

Here, Nd2 is a refractive index of the second lens L2 at d-line wavelength (587.6 nm), and Nd5 is a refractive index of the fifth lens L5 at d-line wavelength (587.6 nm).

Conditional Expression 6, which is a condition on chromatic aberration correction of the optical system, is a conditional expression on the difference in the refractive index at d-line wavelength (587.6 nm) between the second lens L2 and the fifth lens L5. At this time, when satisfying the condition of Conditional Expression 6, it is possible to implement high resolution of the optical system and minimize chromatic aberration.

$$F3/F<-5 \quad \text{Conditional Expression 7}$$

Here, F3 is a focal length of the third lens L3, and F is a focal length of the entire optical system.

Conditional Expression 7, which is a condition on aspherical aberration correction of the optical system, is a conditional expression on the ratio of the focal length of the third lens L3 to the focal length of the entire optical system. At this time, when deviating from an upper limit of Conditional Expression 7, it is difficult to implement high resolution of the optical system due to a difficulty in the aspherical aberration correction.

Hereinafter, a compact wide-angle optical system in accordance with the present invention will be described in detail with reference to specific numerical embodiments.

As described above, all of the following first to fourth embodiments include a first lens L1 having a positive refractive power and an object-side surface convex toward an object side; a second lens L2 having a negative refractive power; a third lens L3 having a negative refractive power; a fourth lens L4 having a positive refractive power; a fifth lens L5 having a positive refractive power and an image-side surface toward an image side; and a sixth lens L6 having a negative refractive power and an image-side surface concave toward the image side, and an optical filter OF, which is formed of an infrared filter or a cover glass coated with the infrared filter, is provided between the sixth lens L6 and an image plane 15.

Further, the first to sixth lenses L1 to L6 are formed of plastic lenses whose both surfaces are aspherical surfaces.

Meanwhile, an aspherical surface used in each of the following embodiments is obtained from known Equation 1, and E and a number following the E used in a Conic constant K and aspherical coefficients A, B, C, D, E, and F represent a 10's power. For example, E+02 represents $10^2$, and E-02 represents $10^{-2}$.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 1]}$$

Here, Z: distance from vertex of lens in the direction of optical axis
Y: distance in the direction perpendicular to optical axis
c: reciprocal of radius of curvature (R) at vertex of lens
K: Conic constant
A, B, C, D, E, F: aspherical coefficients First Embodiment The following Table 1 shows numerical examples according to the first embodiment of the present invention.

Figure 2:
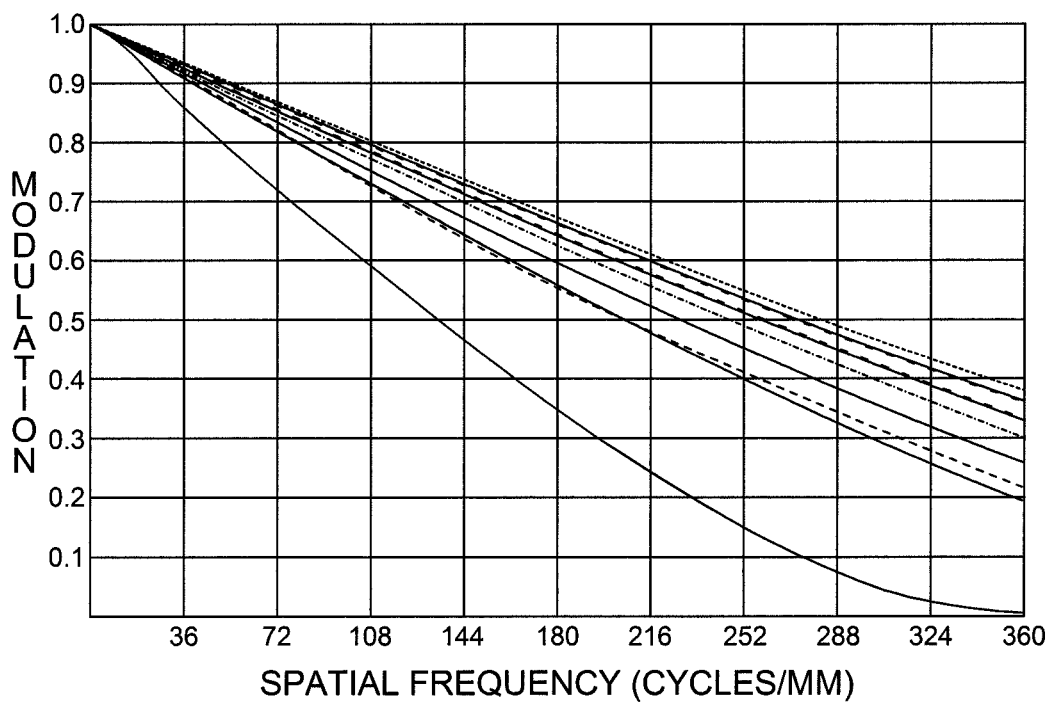
FIG. 2 is an MTF graph of the optical system shown in FIG. 1.
Figure 3:
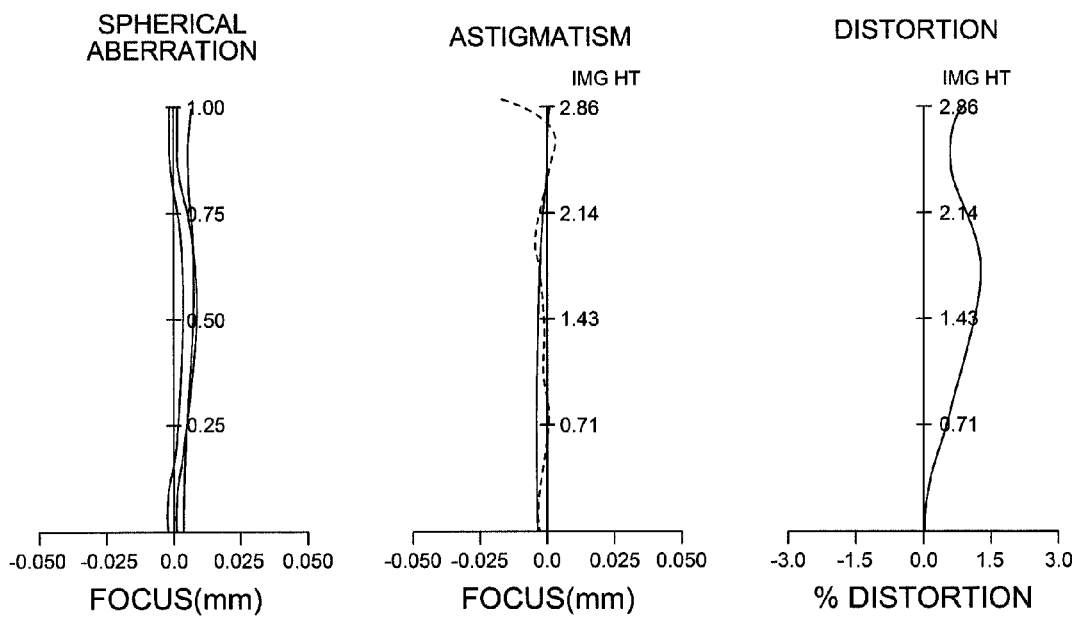
FIG. 3 is a diagram of aberration of the optical system shown in Table 1 and FIG. 1.

Further, FIG. 1 is a configuration diagram showing lens arrangement of an optical system in accordance with the first embodiment of the present invention, FIG. 2 is an MTF graph of the optical system shown in FIG. 1, and FIG. 3 is a diagram of aberration of the optical system shown in Table 1 and FIG. 1.

In the first embodiment, an effective focal length F of the entire optical system is 4.09 mm, and a distance TTL from the first lens L1 to the image plane 15 is 5.0 mm. Further, all of the first to sixth lenses L1 to L6 are aspherical plastic lenses.

Further, in the first embodiment, a focal length F6 of the sixth lens L6 is −5.98 mm, a refractive index of the second lens L2 at d-line wavelength (587.6 nm) is 1.6322, a refractive index of the fifth lens L5 at d-line wavelength (587.6 nm) is 1.6349, and a focal length F3 of the third lens 13 is −100 mm.

TABLE 1

| Surface No. | Radius of Curvature (R) | Thickness (mm) | Refractive Index (n) | Abbe Number (v) | Remarks |
|---|---|---|---|---|---|
| *1 | 1.5260 | 0.368 | 1.546 | 56.1 | First lens |
| *2 | 40.7516 | 0.103 | | | |
| *3 | 3.3040 | 0.265 | 1.639 | 23.4 | Second lens |
| *4 | 1.6417 | 0.346 | | | |

TABLE 1-continued

| Surface No. | Radius of Curvature (R) | Thickness (mm) | Refractive Index (n) | Abbe Number (v) | Remarks |
|---|---|---|---|---|---|
| *5 | 60.4625 | 0.396 | 1.546 | 56.1 | Third lens |
| *6 | 28.6383 | 0.280 | | | |
| *7 | −11.4963 | 0.452 | 1.546 | 56.1 | Fourth lens |
| *8 | −1.8821 | 0.200 | | | |
| *9 | −1.0947 | 0.366 | 1.641 | 24.0 | Fifth lens |
| *10 | −1.4527 | 0.389 | | | |
| *11 | 3.6227 | 0.867 | 1.546 | 56.1 | Sixth lens |
| *12 | 1.5733 | 0.261 | | | |
| 13 | ∞ | 0.300 | 1.519 | 64.2 | Optical filter |
| 14 | ∞ | 0.397 | | | |

In Table 1, the sign * in front of the surface No. represents an aspherical surface. In the first embodiment, both surfaces of the first to sixth lenses L1 to L6 are aspherical surfaces.

Further, values of aspherical coefficients of the first embodiment by Equation 1 are as in the following Table 2.

TABLE 2

| Surface No. | Y diameter | K | A | B | C | D | E |
|---|---|---|---|---|---|---|---|
| 1 | 1.526 | 0.274 | −0.009 | 0.005 | −0.006 | −0.003 | 0.041 |
| 2 | 40.752 | 0.000 | −0.066 | 0.281 | −0.512 | 0.530 | −0.243 |
| 3 | 3.304 | 0.000 | −0.155 | 0.485 | −0.794 | 0.716 | −0.297 |
| 4 | 1.642 | 0.126 | −0.113 | 0.384 | −0.517 | 0.422 | −0.130 |
| 5 | 60.463 | −6.264 | −0.123 | 0.105 | −0.067 | −0.041 | 0.000 |
| 6 | 60.463 | −0.264 | −0.123 | 0.105 | −0.067 | −0.041 | 0.000 |
| 7 | −11.496 | 0.000 | −0.155 | 0.019 | −0.149 | 0.320 | −0.205 |
| 8 | −1.882 | 0.000 | 0.012 | 0.003 | −0.090 | 0.137 | −0.050 |
| 9 | −1.095 | −3.056 | 0.037 | −0.033 | −0.013 | 0.047 | −0.044 |
| 10 | −1.453 | −2.403 | 0.020 | −0.015 | 0.014 | −0.001 | −0.006 |
| 11 | 3.623 | 0.961 | −0.205 | 0.095 | −0.025 | 0.003 | 0.000 |
| 12 | 1.573 | −5.499 | −0.070 | 0.026 | −0.006 | 0.001 | 0.000 |

Second Embodiment

The following Table 3 shows numerical examples according to the second embodiment of the present invention.

Figure 4:
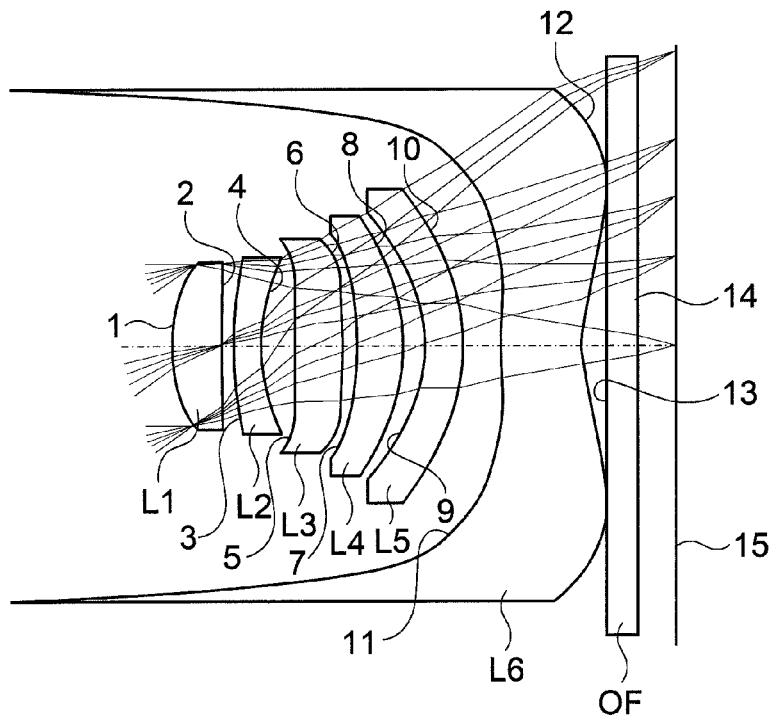
FIG. 4 is a configuration diagram showing lens arrangement of an optical system for cameras in accordance with a second embodiment of the present invention.
Figure 5:
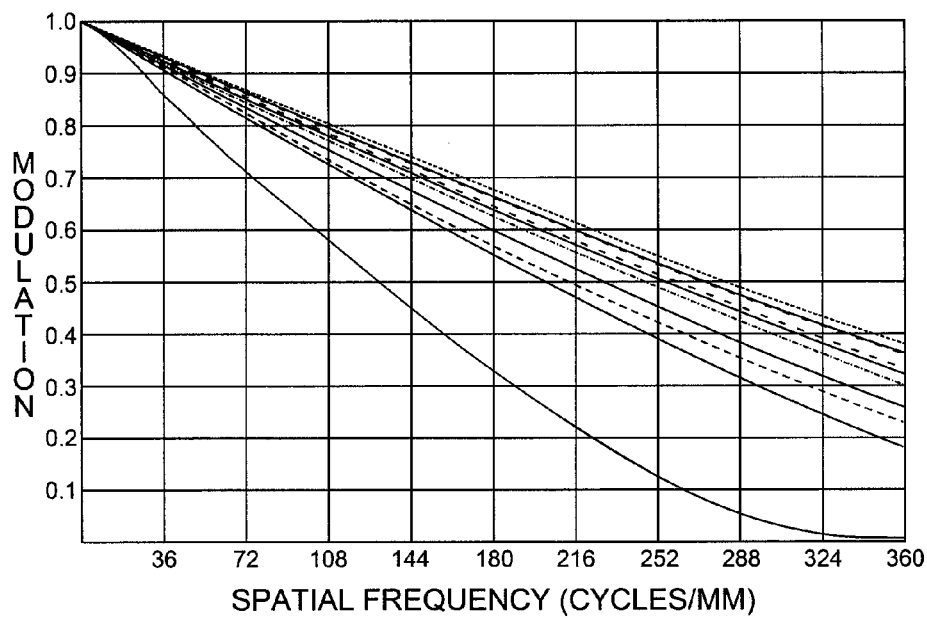
FIG. 5 is an MTF graph of the optical system shown in FIG. 4.
Figure 6:
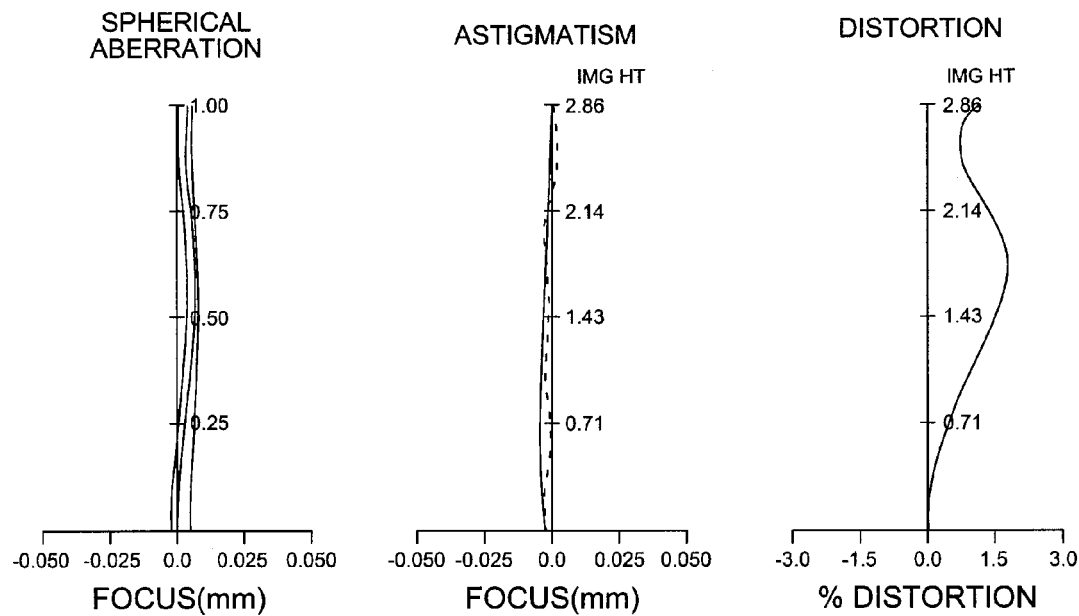
FIG. 6 is a diagram of aberration of the optical system shown in Table 3 and FIG. 4.

Further, FIG. 4 is a configuration diagram showing lens arrangement of an optical system for cameras in accordance with the second embodiment of the present invention, FIG. 5 is an MTF graph of the optical system shown in FIG. 4, and FIG. 6 is a diagram of aberration of the optical system shown in Table 3 and FIG. 4.

In the second embodiment, an effective focal length F of the entire optical system is 4.08 mm, and a distance TTL from the first lens L1 to the image plane 15 is 4.98 mm. Further, all of the first to sixth lenses L1 to L6 are aspherical plastic lenses.

Further, in the second embodiment, a focal length of the sixth lens L6 is −4.45 mm, a refractive index of the second lens L2 at d-line wavelength (587.6 nm) is 1.6322, a refractive index of the fifth lens L5 at d-line wavelength (587.6 nm) is 1.6349, and a focal length F3 of the third lens L3 is −100 mm.

TABLE 3

| Surface No. | Radius of Curvature (R) | Thickness (mm) | Refractive Index (n) | Abbe Number (v) | Remarks |
|---|---|---|---|---|---|
| *1 | 1.5579 | 0.524 | 1.546 | 56.1 | First lens |
| *2 | 52.8207 | 0.100 | | | |
| *3 | 4.1293 | 0.265 | 1.639 | 23.4 | Second lens |

TABLE 3-continued

| Surface No. | Radius of Curvature (R) | Thickness (mm) | Refractive Index (n) | Abbe Number (v) | Remarks |
|---|---|---|---|---|---|
| *4 | 1.8117 | 0.328 | | | |
| *5 | 31.2499 | 0.468 | 1.546 | 56.1 | Third lens |
| *6 | 19.7761 | 0.152 | | | |
| *7 | −18.8115 | 0.468 | 1.546 | 56.1 | Fourth lens |
| *8 | −1.8607 | 0.200 | | | |
| *9 | −1.1485 | 0.374 | 1.641 | 24.0 | Fifth lens |
| *10 | −1.4518 | 0.379 | | | |
| *11 | 5.3377 | 0.810 | 1.546 | 56.1 | Sixth lens |
| *12 | 1.5809 | 0.230 | | | |
| 13 | ∞ | 0.300 | 1.519 | 64.2 | Optical filter |
| 14 | ∞ | 0.3972 | | | |

In Table 3, the sign * in front of the surface No. represents an aspherical surface. In the second embodiment, both surfaces of the first to sixth lenses L1 to L6 are aspherical surfaces.

Further, values of aspherical coefficients of the second embodiment by Equation 1 are as in the following Table 4.

TABLE 4

| Surface No. | Y diameter | K | A | B | C | D | E |
|---|---|---|---|---|---|---|---|
| 1 | 1.558 | 0.264 | −0.008 | 0.002 | −0.011 | −0.010 | 0.034 |
| 2 | 52.821 | 0.000 | −0.073 | 0.265 | −0.513 | 0.524 | −0.260 |
| 3 | 4.129 | 0.000 | −0.170 | 0.477 | −0.793 | 0.732 | −0.309 |
| 4 | 1.812 | −0.359 | −0.120 | 0.376 | −0.514 | 0.400 | −0.143 |
| 5 | 31.250 | −6.264 | −0.122 | 0.081 | −0.053 | −0.049 | 0.000 |
| 6 | 19.776 | 1.931 | −0.196 | 0.015 | 0.026 | −0.059 | 0.000 |
| 7 | −18.811 | 0.000 | −0.193 | −0.005 | −0.143 | 0.320 | −0.207 |
| 8 | −1.861 | 0.000 | 0.008 | −0.005 | −0.090 | 0.137 | −0.050 |
| 9 | −1.148 | −3.133 | 0.031 | −0.035 | −0.013 | 0.047 | −0.044 |
| 10 | −1.452 | −2.700 | 0.010 | −0.015 | 0.015 | −0.001 | −0.006 |
| 11 | 5.338 | 2.421 | −0.214 | 0.094 | −0.024 | 0.003 | 0.000 |
| 12 | 1.581 | −6.412 | −0.070 | 0.025 | −0.006 | 0.001 | 0.000 |

Third Embodiment

The following Table 5 shows numerical examples according to the third embodiment of the present invention.

Figure 7:
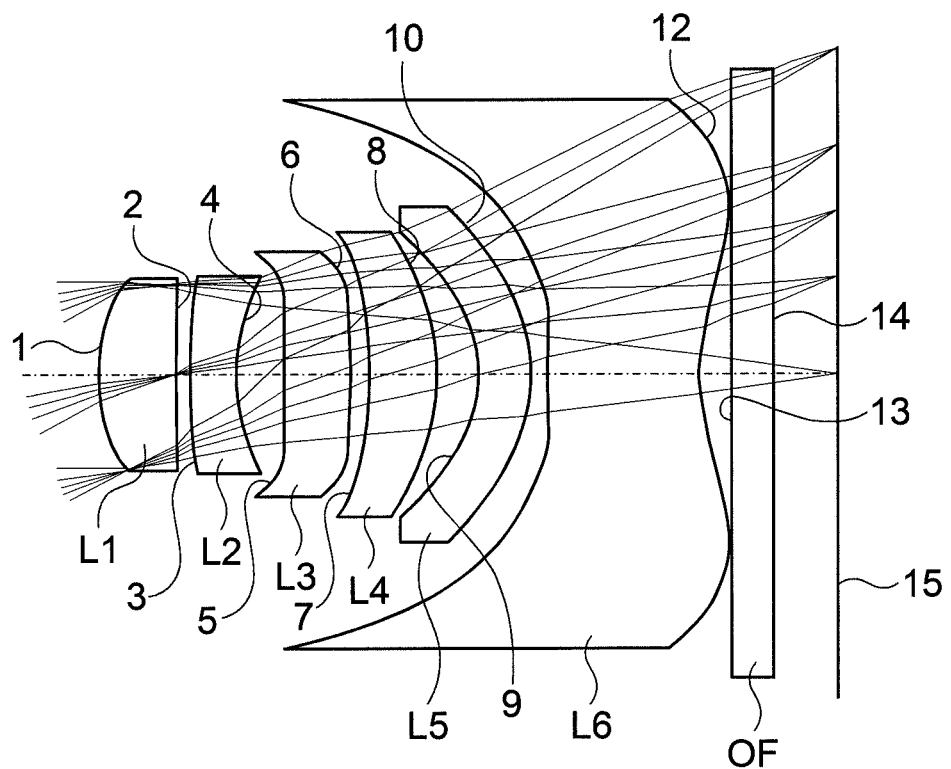
FIG. 7 is a configuration diagram showing lens arrangement of an optical system for cameras in accordance with a third embodiment of the present invention.
Figure 8:
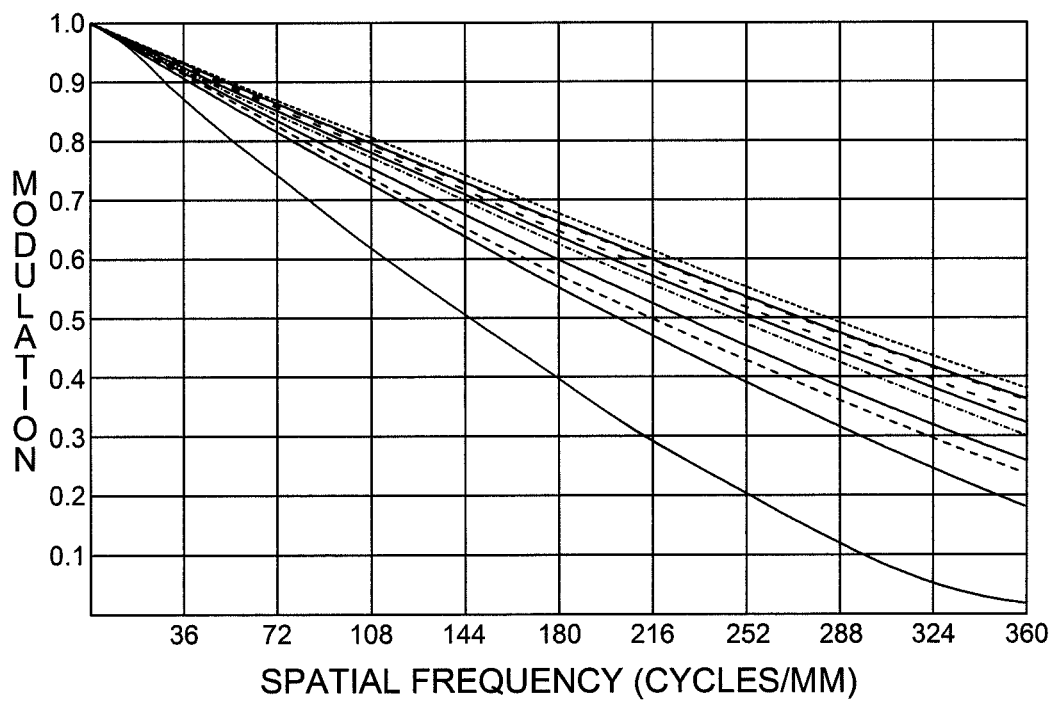
FIG. 8 is an MTF graph of the optical system shown in FIG. 7.
Figure 9:
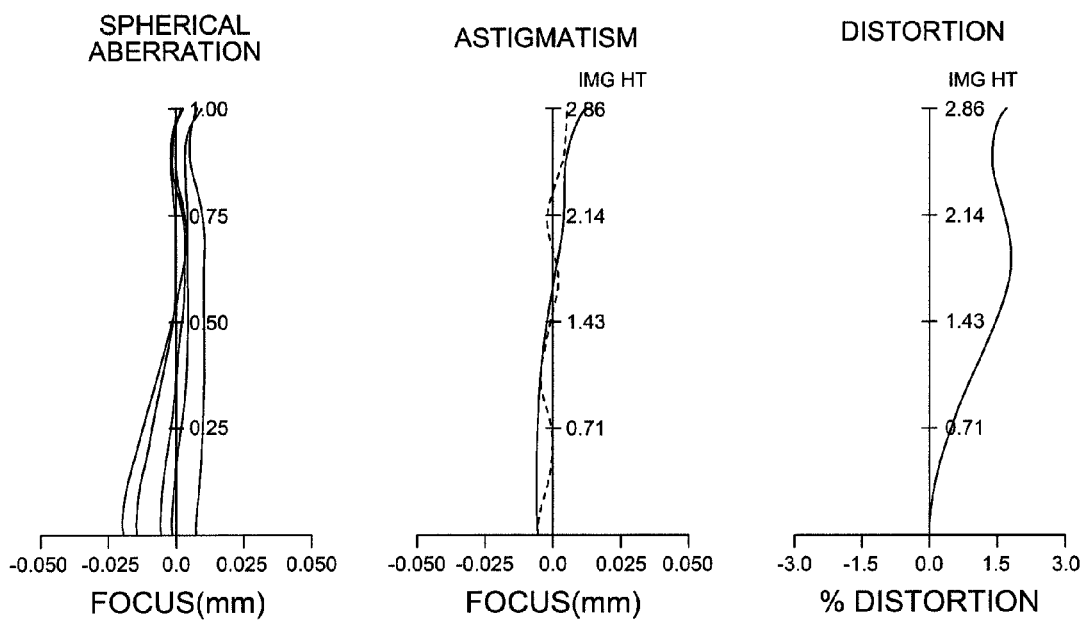
FIG. 9 is a diagram of aberration of the optical system shown in Table 5 and FIG. 7.

Further, FIG. 7 is a configuration diagram showing lens arrangement of an optical system for cameras in accordance with the third embodiment of the present invention, FIG. 8 is an MTF graph of the optical system shown in FIG. 7, and FIG. 9 is a diagram of aberration of the optical system shown in Table 5 and FIG. 7.

In the third embodiment, an effective focal length F of the entire optical system is 4.25 mm, and a distance TTL from the first lens L1 to the image plane 15 is 5.15 mm. Further, all of the first to sixth lenses L1 to L6 are aspherical plastic lenses.

Further, in the third embodiment, a focal length of the sixth lens L6 is −4.80 mm, a refractive index of the second lens L2 at d-line wavelength (587.6 nm) is 1.6322, a refractive index of the fifth lens L5 at d-line wavelength (587.6 nm) is 1.5255, and a focal length F3 of the third lens L3 is −100 mm.

TABLE 5

| Surface No. | Radius of Curvature (R) | Thickness (mm) | Refractive Index (n) | Abbe Number (v) | Remarks |
|---|---|---|---|---|---|
| *1 | 1.622 | 0.522 | 1.545 | 58.6 | First lens |
| *2 | 14.1321 | 0.100 | | | |

TABLE 5-continued

| Surface No. | Radius of Curvature (R) | Thickness (mm) | Refractive Index (n) | Abbe Number (v) | Remarks |
|---|---|---|---|---|---|
| *3 | 4.2747 | 0.325 | 1.639 | 23.4 | Second lens |
| *4 | 1.9509 | 0.323 | | | |
| *5 | 9.000 | 0.460 | 1.553 | 64.4 | Third lens |
| *6 | 7.6039 | 0.120 | | | |
| *7 | 14.4977 | 0.480 | 1.544 | 54.4 | Fourth lens |
| *8 | −2.6646 | 0.301 | | | |
| *9 | −1.2720 | 0.363 | 1.525 | 53.4 | Fifth lens |
| *10 | −1.6007 | 0.116 | | | |
| *11 | 7.4492 | 1.046 | 1.543 | 65.1 | Sixth lens |
| *12 | 1.8403 | 0.228 | | | |
| 13 | ∞ | 0.300 | 1.519 | 64.2 | Optical filter |
| 14 | ∞ | 0.436 | | | |

In Table 5, the sign * in front of the surface No. represents an aspherical surface. In the third embodiment, both surfaces of the first to sixth lenses L1 to L6 are aspherical surfaces.

Further, values of aspherical coefficients of the third embodiment by Equation 1 are as in the following Table 6.

TABLE 6

| Surface No. | Y diameter | K | A | B | C | D | E |
|---|---|---|---|---|---|---|---|
| 1 | 1.622 | 0.348 | −0.010 | 0.006 | −0.015 | 0.012 | 0.006 |
| 2 | 14.132 | 0.000 | −0.154 | 0.403 | −0.611 | 0.529 | −0.213 |
| 3 | 4.275 | 0.000 | −0.268 | 0.601 | −0.818 | 0.611 | −0.204 |
| 4 | 1.951 | 0.984 | −0.194 | 0.403 | −0.467 | 0.262 | −0.041 |
| 5 | 9.000 | −6.264 | −0.147 | 0.104 | −0.054 | −0.072 | 0.000 |
| 6 | 7.604 | 1.931 | −0.234 | 0.007 | 0.044 | −0.042 | 0.000 |
| 7 | 14.498 | 0.000 | −0.170 | −0.006 | −0.150 | 0.386 | −0.249 |
| 8 | −2.665 | 0.000 | −0.012 | −0.005 | −0.090 | 0.137 | −0.050 |
| 9 | −1.272 | −5.056 | −0.017 | −0.021 | −0.013 | 0.047 | −0.044 |
| 10 | −1.601 | −5.435 | −0.075 | 0.038 | 0.011 | −0.008 | −0.004 |
| 11 | 7.449 | −109.275 | −0.219 | 0.096 | −0.021 | 0.002 | 0.000 |
| 12 | 1.840 | −7.257 | −0.064 | 0.022 | −0.006 | 0.001 | 0.000 |

Fourth Embodiment

The following Table 7 shows numerical examples according to the fourth embodiment of the present invention.

Figure 10:
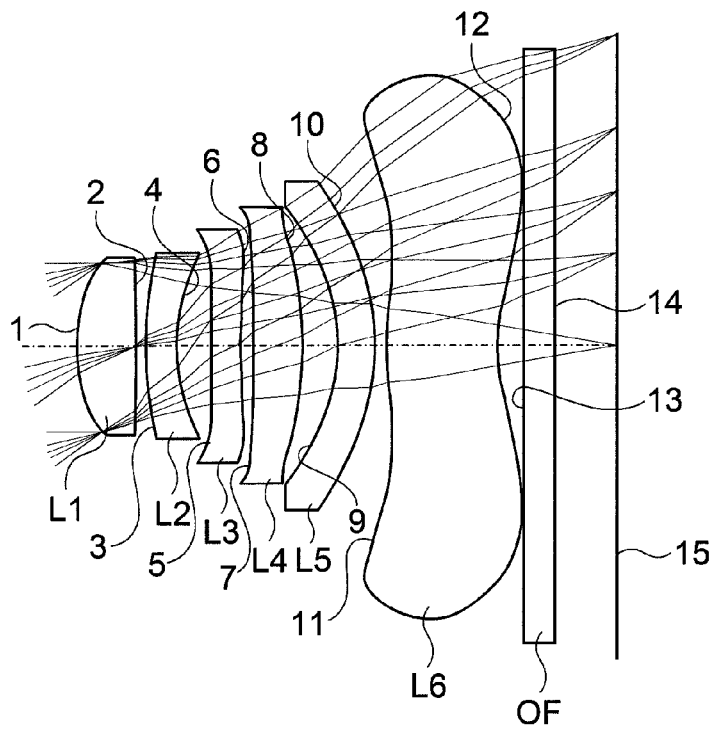
FIG. 10 is a configuration diagram showing lens arrangement of an optical system for cameras in accordance with a fourth embodiment of the present invention.
Figure 11:
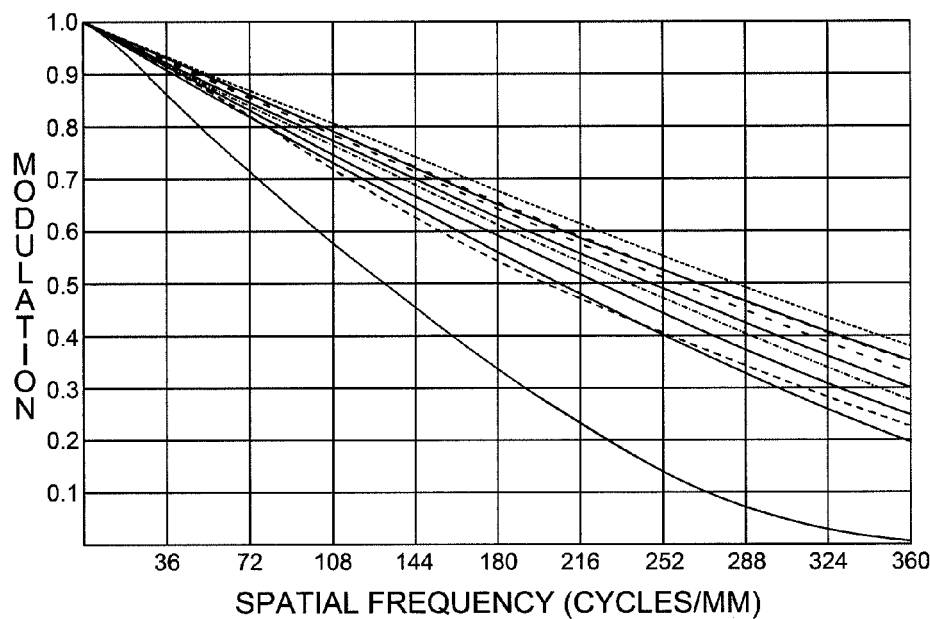
FIG. 11 is an MTF graph of the optical system shown in FIG. 10.
Figure 12:
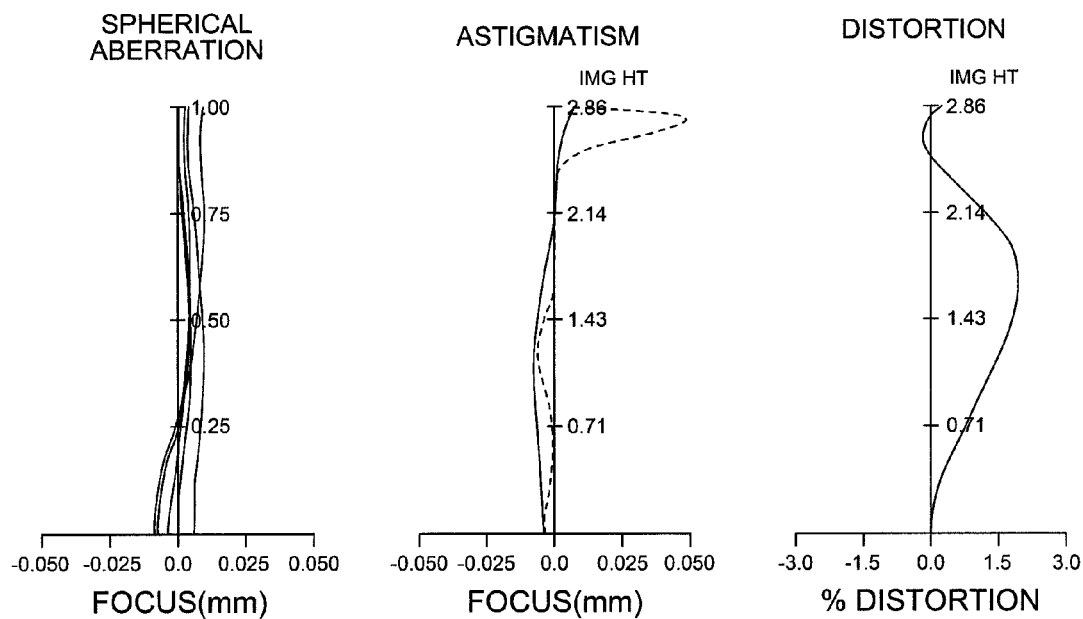
FIG. 12 is a diagram of aberration of the optical system shown in Table 7 and FIG. 10.

Further, FIG. 10 is a configuration diagram showing lens arrangement of an optical system for cameras in accordance with the fourth embodiment of the present invention, FIG. 11 is an MTF graph of the optical system shown in FIG. 10, and FIG. 12 is a diagram of aberration of the optical system shown in Table 7 and FIG. 10.

In the fourth embodiment, an effective focal length F of the entire optical system is 4.07 mm, and a distance TTL from the first lens L1 to the image plane 15 is 5.01 mm. Further, all of the first to sixth lenses L1 to L6 are aspherical plastic lenses.

Further, in the fourth embodiment, a focal length of the sixth lens L6 is −23.26 mm, a refractive index of the second lens L2 at d-line wavelength (587.6 nm) is 1.6322, a refractive index of the fifth lens L5 at d-line wavelength (587.6 nm) is 1.6349, and a focal length F3 of the third lens L3 is −24.42 mm.

TABLE 7

| Surface No. | Radius of Curvature (R) | Thickness (mm) | Refractive Index (n) | Abbe Number (v) | Remarks |
|---|---|---|---|---|---|
| *1 | 1.5876 | 0.546 | 1.546 | 56.1 | First lens |
| *2 | 28.2697 | 0.100 | | | |

TABLE 7-continued

| Surface No. | Radius of Curvature (R) | Thickness (mm) | Refractive Index (n) | Abbe Number (v) | Remarks |
|---|---|---|---|---|---|
| *3 | 3.2326 | 0.282 | 1.639 | 23.4 | Second lens |
| *4 | 1.6274 | 0.305 | | | |
| *5 | 7.0777 | 0.280 | 1.546 | 56.1 | Third lens |
| *6 | 4.5532 | 0.120 | | | |
| *7 | 12.4861 | 0.463 | 1.546 | 56.1 | Fourth lens |
| *8 | −3.8661 | 0.320 | | | |
| *9 | −1.1565 | 0.360 | 1.641 | 24.0 | Fifth lens |
| *10 | −1.4830 | 0.102 | | | |
| *11 | 2.4612 | 1.029 | 1.546 | 56.1 | Sixth lens |
| *12 | 1.7573 | 0.223 | | | |
| 13 | ∞ | 0.300 | 1.519 | 64.2 | Optical filter |
| 14 | ∞ | 0.573 | | | |

In Table 7, the sign * in front of the surface No. represents an aspherical surface. In the fourth embodiment, both surfaces of the first to sixth lenses L1 to L6 are aspherical surfaces.

Further, values of aspherical coefficients of the fourth embodiment by Equation 1 are as in the following Table 8.

TABLE 8

| Surface No. | Y diameter | K | A | B | C | D | E |
|---|---|---|---|---|---|---|---|
| 1 | 1.588 | 0.209 | −0.013 | 0.000 | −0.029 | 0.005 | 0.017 |
| 2 | 28.270 | 0.000 | −0.160 | 0.378 | −0.622 | 0.533 | −0.223 |
| 3 | 3.233 | 0.000 | −0.288 | 0.607 | −0.814 | 0.620 | −0.191 |
| 4 | 1.627 | 0.567 | −0.208 | 0.386 | −0.436 | 0.251 | −0.022 |
| 5 | 7.078 | −6.264 | −0.087 | 0.064 | −0.071 | −0.032 | 0.000 |
| 6 | 4.553 | 1.931 | −0.081 | −0.007 | 0.018 | −0.030 | 0.000 |
| 7 | 12.486 | 0.000 | −0.068 | −0.002 | −0.162 | 0.375 | −0.254 |
| 8 | −3.866 | 0.000 | −0.004 | −0.001 | −0.090 | 0.137 | −0.050 |
| 9 | −1.156 | −5.285 | 0.011 | −0.008 | −0.013 | 0.047 | −0.044 |
| 10 | −1.483 | −5.840 | −0.066 | 0.045 | 0.010 | −0.009 | −0.004 |
| 11 | 2.461 | −6.322 | −0.180 | 0.082 | −0.021 | 0.003 | 0.000 |
| 12 | 1.757 | −4.217 | −0.079 | 0.026 | −0.006 | 0.001 | 0.000 |

Meanwhile, values of Conditional Expressions for the first to fourth embodiments are as in the following Table 9.

TABLE 9

| | Embodiment 1 | Embodiment 2 | Embodiment 3 | Embodiment 4 |
|---|---|---|---|---|
| Conditional expression 1 | 32.6 | 32.6 | 41.0 | 32.6 |

TABLE 9-continued

| | Embodiment 1 | Embodiment 2 | Embodiment 3 | Embodiment 4 |
|---|---|---|---|---|
| Conditional expression 2 | 1.22 | 1.22 | 1.2 | 1.23 |
| Conditional expression 3 | −1.46 | −1.09 | −1.12 | −5.71 |
| Conditional expression 4 | 1.29 | 1.17 | 0.80 | 0.79 |
| Conditional expression 5 | −2.81 | −4.61 | 3.40 | 3.06 |
| Conditional expression 6 | −0.0028 | −0.0028 | 0.1066 | −0.0028 |
| Conditional expression 7 | −24.52 | −24.60 | −23.51 | −5.99 |

As described above, the optical system in accordance with the present invention can improve aberration correction efficiency and reduce manufacturing costs by forming six lenses with aspherical plastic lenses and implement high resolution by minimizing chromatic aberration.

Further, the present invention can manufacture a high resolution optical system by configuring the first and fourth lenses of the six lenses constituting the optical system to have a positive refractive power and thus reducing an aberration value.

As described above, although the preferable embodiments of the present invention have been shown and described, it will be appreciated by those skilled in the art that substitutions. modifications and variations may be made in these embodiments without departing from the principles and spirit of the general inventive concept, the scope of which is defined in the appended claims and their equivalents.

What is claimed is:

1. An optical system consisting of, sequentially from an object side:
   a first lens having a positive refractive power and an object-side surface convex toward the object side;
   a second lens having a negative refractive power;
   a third lens having a negative refractive power;
   a fourth lens having a positive refractive power;
   a fifth lens having a negative refractive power and an image-side surface convex toward an image side; and
   a six lens having a negative refractive power and an image-side surface concave toward the image side.

2. The optical system according to claim 1, wherein the optical system satisfies the following Conditional Expression with respect to conditions on chromatic aberration correction:

$$|V3-V2|<41, \quad \text{Conditional Expression}$$

where V3 is an Abbe number of the third lens, and V2 is an Abbe number of the second lens.

3. The optical system according to claim 1, wherein the optical system satisfies the following Conditional Expression with respect to conditions on design of the optical system:

$$TTL/F<1.5, \quad \text{Conditional Expression}$$

where TTL is a distance from the first lens to an image plane, and F is a focal length of the entire optical system.

4. The optical system according to claim 1, wherein the optical system satisfies the following Conditional Expression with respect to conditions on miniaturization according to the focal length ratio of the optical system:

$$1<|F6/F|<6, \quad \text{Conditional Expression}$$

where F6 is a focal length of the sixth lens, and F is a focal length of the entire optical system.

5. The optical system according to claim 1, wherein the optical system satisfies the following Conditional Expression with respect to conditions on miniaturization according to the radius of curvature of the lenses of the optical system:

$$0<(R7+R10)/(R7-R10)<1.3, \quad \text{Conditional Expression}$$

where R7 is a radius of curvature of an object-side surface of the fourth lens, and R10 is a radius of curvature of an image-side surface of the fifth lens.

6. The optical system according to claim 1, wherein the optical system satisfies the following Conditional Expression with respect to conditions of aberration correction of the optical system:

$$|R7/F|<5, \quad \text{Conditional Expression}$$

where R7 is a radius of curvature of the object-side surface of the fourth lens, and F is a focal length of the entire optical system.

7. The optical system according to claim 1, wherein the optical system satisfies the following Conditional Expression with respect to conditions on chromatic aberration correction of the optical system:

$$|Nd2-Nd5|<0.11, \quad \text{Conditional Expression}$$

where Nd2 is a refractive index of the second lens at d-line wavelength (587.6 nm), and Nd5 is a refractive index of the fifth lens at d-line wavelength (587.6 nm).

8. The optical system according to claim 1, wherein the optical system satisfies the following Conditional Expression with respect to conditions on spherical aberration correction of the optical system:

$$F3/F<-5, \quad \text{Conditional Expression}$$

where F3 is a focal length of the third lens, and F is a focal length of the entire optical system.

9. The optical system according to claim 1, wherein the first to sixth lenses are plastic lenses.

10. The optical system according to claim 1, wherein both surfaces of the first to sixth lenses are aspherical surfaces.

11. The optical system according to claim 1, further comprising:
   an optical filter provided between the six lens and an image plane and formed of a cover glass coated with an infrared cut filter for blocking excessive infrared rays included in light introduced from the outside.

* * * * *